July 11, 1933.  A. P. WOOLFOLK  1,918,074
SINK FOR KITCHEN CABINETS
Filed Oct. 3, 1931
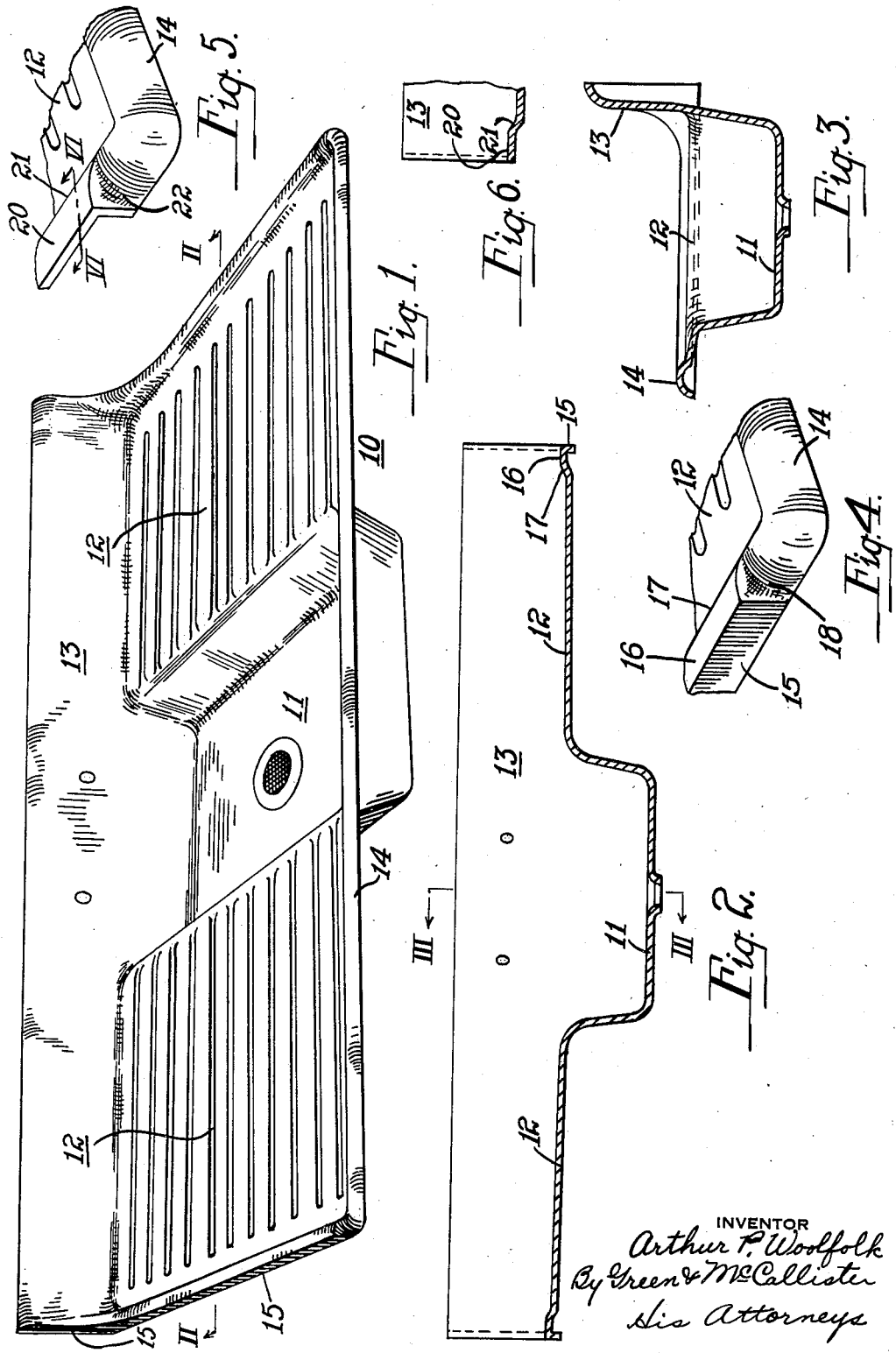
INVENTOR
Arthur P. Woolfolk
By Green & McCallister
His Attorneys Patented July 11, 1933

1,918,074

UNITED STATES PATENT OFFICE

ARTHUR P. WOOLFOLK, OF PITTSBURGH, PENNSYLVANIA, ASSIGNOR TO STANDARD SANITARY MANUFACTURING COMPANY, A CORPORATION OF NEW JERSEY

SINK FOR KITCHEN CABINETS

Application filed October 3, 1931. Serial No. 566,668.

This invention relates to kitchen sinks, and in particular to improvements in the construction of sinks adapted to be used in conjunction with kitchen cabinets and the like.

In the manufacture of kitchen sinks or the like, in which all the exposed surfaces are enameled, it is common practice to roll or curve the corners thereof and form a rolled upper edge around the front and sides of the sink. Such construction is necessary in order to secure a good enameled product, since it is exceedingly difficult, if not impossible, to enamel over a sharp or squared corner.

In recent years it has become increasingly common, especially in apartment house construction where all available space in the kitchen is utilized, to install the sink as a part of a kitchen cabinet or to install the sink and cabinet in an alcove provided for that purpose. It is customary to install the sink so that the sides thereof abut against the sides of the cabinet or alcove. It is apparent that kitchen sinks having a rolled upper edge around the front and sides thereof are not adapted for installation with kitchen cabinets principally because the rolled edge abutting against the sides of the cabinet forms a dirt collecting groove around the sink.

Sinks have been designed heretofore for overcoming this objection when installed as a unit with a kitchen cabinet. These sinks have been provided with thin, narrow side walls which extend upwardly from the drainboards and outwardly from the back wall of the sink and abut against the sides of the cabinet or alcove. While this type of sink eliminates the dirt collecting grooves it is objectionable in that it is practically impossible to enamel all the exposed surfaces thereof due to the narrowness of the wall and the sharpness of the edges.

It is an object of this invention to provide a sink for kitchen cabinets in which all the exposed parts of the sink may be readily enameled.

Another object of this invention is to provide a sink for kitchen cabinets or the like which will be flush with the sides of the cabinet and eliminate all dirt collecting grooves.

A further object of this invention is to provide a sink for kitchen cabinets of novel construction which is relatively simple to make and relatively cheap to manufacture.

These and other objects which will be made apparent to those skilled in this particular art are accomplished by means of this invention, one embodiment of which is described in the following specification and illustrated in the accompanying drawing, wherein;

Figure 1 is a view in perspective of a kitchen sink embodying my invention;

Fig. 2 is a view in section taken on the line II—II of Figure 1;

Fig. 3 is a view in section taken on the line III—III;

Fig. 4 is an enlarged partial view in perspective showing the construction of the corner of the sink.

Fig. 5 is an enlarged partial view in perspective of a corner of a sink embodying a modification of my invention; and Fig. 6 is a view in section taken on line VI—VI of Fig. 5.

Referring to the drawing in detail, 10 designates a kitchen fixture having a sink 11, a drainboard 12, on each side thereof and a back wall 13 integral with the sink and drainboards. The front edges of the sink 11 and the front and a portion of the sides of the drainboards 12 terminate in a rolled portion 14 forming a roll rim around the front and a portion of the sides of the sink. So that the fixture 10 will be flush with the sides of a kitchen cabinet or alcove when installed as a unit therewith, the sink is provided with flat side walls 15 which extend downwardly below the top of the drainboards 12 and inwardly from the back wall 13. The walls 15 abut against the sides of the cabinet or alcove when the sink is installed and eliminate the dirt collecting grooves along the side thereof.

In order that all the exposed surfaces of the sink may be readily enameled, the tops of the side walls 15 terminate in inwardly extending flat surfaces 16 which are connected to the drainboards 12 by curved surfaces 17. The surfaces 16 are formed at right angles to the side walls 15 and are arranged in the same horizontal plane as the top of the rolled portion 14 along the sides of the drainboards 12. At the rear of the sink the edges of the walls 15 are flush with the back wall 13 and at right angles thereto. The curved surface 17 which connects the surfaces 16 with the drainboards 12 is formed on the same radius as the radius of the inner portion of the roll rim 14. To connect the roll rim 14 to the corner surface 16, the outer portion of the rim 14 is flared outwardly and upwardly at points intermediate of the length of the sides of the sink to form gradually curved surfaces 18.

From this construction it is apparent that I have designed a sink having flat side walls which, when the sink is installed in a cabinet, will be flush with the sides thereof. It is also apparent that the sides 15 and the surface 16 form a squared portion adjacent the walls of the cabinet on the sink which eliminates dirt collecting grooves and the like along the sides of the sink. It is also apparent that the exposed surface of the sink is free from sharp edges and corners and as a result may be readily and easily enameled.

In Figs. 5 and 6 I have illustrated a modified form of sink construction wherein the walls 15 along the sides of the drainboard 12 and back wall 13 are eliminated. In the modification the sides of the drainboards 12 terminate in flat rims 20 the outer edges of which are squared so that the rim will abut against the side of a cabinet or the like. Each of rims 20 have a curved or rounded surface 21 connecting the inner edge thereof with the body of the drainboard 12 which is formed on the same radius as and is a continuation of the inner portion of the roll rim 14. The flat rims 20 are located in the same horizontal plane as the top of the roll rim 14 and the outer portion of the roll rim is flared upwardly at points intermediate to the length of the sides of the sink to form surfaces 22 which connect the rim 14 to the flat surfaces 20. It is apparent that a sink constructed in accordance with this modification is readily adapted for installation with kitchen cabinets and the like. The space between the bottom of the rim 20 and the bottom of the rolled portion 14 may be readily filled in with wood or other suitable material painted to correspond with the cabinet in color.

While I have illustrated a kitchen fixture having a sink and two drainboards, it is to be understood that my invention may be applied to any type of kitchen fixture such as a sink alone, or as a sink with one drainboard as well as two.

It is to be understood that certain modifications may be made herein without departing from the spirit of my invention or the scope of the appended claims.

What I claim as new and desire to secure by Letters Patent is:

1. A sink of the type described having a roll rim edge provided with an inner and outer curved portion, the inner portion of said roll rim extending around the front and sides of the sink and the outer portion extending around the front and being flared upwardly intermediate of the length of the sides of said sink and terminating in a flat surface whereby a square side rim is formed on a portion of each side of the sink.

2. A sink of the type described having a roll rim edge provided with an inner and outer curved portion, the inner portion of said roll rim extending around the front and sides of the sink and the outer portion extending around the front and being flared upwardly intermediate the length of the sides and terminating in a flat surface and an abutting surface depending from said flat surface.

3. A sink of the type described having a roll rim around the front and portions of the sides thereof and a square rim on the remaining side portions of the sink, said square rim having a curved inner surface connecting it with the body of said sink, said curved surface being formed on the same radius as the curved inner surface of the roll rim and being a continuation thereof, the outer portion of said roll rim being flared upwardly along each side of the sink and terminating in the square rim.

In testimony whereof, I have hereunto subscribed my name this 1st day of October, 1931.

ARTHUR P. WOOLFOLK.